(12) United States Patent
Gilbert

(10) Patent No.: US 6,666,246 B2
(45) Date of Patent: Dec. 23, 2003

(54) AUTOMATED PLANER MACHINE

(75) Inventor: Sylvain Gilbert, Saint-Prime (CA)

(73) Assignee: Les Produits Gilbert, Inc., Roberval (CA)

( * ) Notice: Subject to any disclaimer, the term of this patent is extended or adjusted under 35 U.S.C. 154(b) by 0 days.

(21) Appl. No.: 10/138,676

(22) Filed: May 3, 2002

(65) Prior Publication Data

US 2003/0205293 A1 Nov. 6, 2003

(51) Int. Cl.[7] ........................ B23Q 15/00; B23Q 16/00; B27C 1/00; B27C 1/12; B27B 31/00
(52) U.S. Cl. ................. 144/382; 144/117.1; 144/116; 144/114.1; 144/242.1; 144/246.1; 144/246.2; 144/250.12; 144/250.13; 144/250.18; 144/356; 144/248.4; 198/624; 451/190; 451/302; 700/167
(58) Field of Search ................................. 451/300, 301, 451/302–336, 190; 144/2.1, 114.1, 116, 117.1, 242.1, 246.1, 246.2, 250.13, 248.4, 356, 357, 382, 130, 250.12, 250.18; 198/624–722, 836.2, 434, 468.2, 411, 413; 700/159, 160, 167–213

(56) References Cited

U.S. PATENT DOCUMENTS

| | | | | | |
|---|---|---|---|---|---|
| 2,102,186 | A | * | 12/1937 | Nicholson et al. | 144/114.1 |
| 4,457,350 | A | * | 7/1984 | Finnila | 144/117.1 |
| 5,368,077 | A | * | 11/1994 | Croghan et al. | 144/114.1 |
| 5,396,938 | A | * | 3/1995 | Cannaday | 144/357 |
| 5,649,580 | A | * | 7/1997 | Mierau et al. | 144/357 |
| 6,247,511 | B1 | * | 6/2001 | Meada et al. | 144/357 |
| 6,323,452 | B1 | * | 11/2001 | Bonnet | 198/320.04 |

* cited by examiner

Primary Examiner—W. Donald Bray
(74) Attorney, Agent, or Firm—Myers Bigel Sibley & Sajovec, PA

(57) ABSTRACT

An automated planer machine for planing a piece of lumber. The planer machine has a feed table for slidably receiving the bottom surface of the piece of lumber along a traveling course. One or more planing heads extend on sides of the traveling course to plane the surfaces of the piece of lumber. A linebar laterally guides the piece of lumber. Feed rolls along the traveling course move the piece of lumber. Positioning devices responsive to respective control signals are provided for adjusting a height of the feed table and planing levels of the planing heads as much when the planer machine is idle as during operation. Position encoders coupled to the feed table and the planing heads produce positional signals usable to accurately position them using the positioning devices.

39 Claims, 17 Drawing Sheets

AUTOMATED PLANER MACHINE

FIELD OF THE INVENTION

The present invention relates to lumber processing sawmill equipment, and more particularly to an automated planer machine.

BACKGROUND

Planing machines are used in the lumber industry to profile the four sides of a piece of lumber according to desired dimensions.

The usual main components of a planing machine comprise a feed table, upper and lower planing heads (also called cylinders), a linebar, and right and left side planing heads. The feed table is used for vertical positioning of the piece of lumber with respect to the upper and lower planing heads. The upper and lower planing heads are vertically adjustable and are used to respectively plane the top and bottom surfaces of the piece of lumber. The linebar is usually fixed and is used to laterally guide the piece of lumber along a traveling course in the planing machine. The right and left side planing heads are laterally adjustable and are used to respectively plane the right and left surfaces of the piece of lumber.

A supply table upstream from the planing machine is normally used to position the piece of lumber and forward it at a high speed toward the planing machine. The piece is picked-up vertically by the feed table and sideways by the fixed linebar. The four side surfaces of the piece of lumber are profiled by the planing heads. The vertical and lateral positions of the planing heads are adjusted to obtain the desired dimensions. The pieces of lumber, to be admissible on the market, must meet certain standards determining the finishing dimensioning and quality of the surfaces. The pieces, after the planing process, are graded depending on the obtained results and the retail price is set as a function of these results. Many pieces will be downgraded (this term is used to identify a piece presenting defects and whose retail price will be reduced proportionally to its state) because they present some wane. Wane defines a machining defect due to a lack of material during the profiling of the piece. When the position of the feed table is too high, the piece of lumber passes above the lower planing head without the planing head being able to take some material off. This phenomenon is called bottom waning. Likewise, when the feed table is too low, the piece of lumber passes below the upper planing head without the planing head being able to pick material off, causing top waning. It is the same for the side planing heads where left or right waning may happen.

Waning defects are problems frequently encountered in a planing machine. A piece of lumber presenting some wane looses a part of its value and thus represents important financial losses for planing mills.

In conventional planing machines, the position adjustments of the planing heads and the feed table are achieved manually. The adjustments take a lot of time and their accuracy is hard to reach because only a few reference points are available. Precision rulers or other measuring instruments that may facilitate this laborious operation are used. Down times are numerous and long: correction of wane, size settings, production changes (other sizes) and unjamming operations to remove a piece broken or jammed in the planing machine. The financial losses due to down times of the planing machine become soon astronomic.

SUMMARY

An object of the present invention is to provide a planing machine having an automated positioning system for improved performance over the planing machines of the prior art.

Another object of the invention is to provide a planing machine capable of achieving piece by piece optimization.

Another object of the present invention is to provide a planing machine having a design which facilitates access to the planing heads and some other parts, improves the visibility, and facilitates unjamming or repair operations if necessary.

Another object of the present invention is to provide a planing machine having certain parts having improved design and construction for high rate production.

Another object of the present invention is to provide a planing machine having planing heads which can be repositioned during operation.

According to the present invention, there is provided an automated planer machine for planing a piece of lumber having top, side and bottom surfaces, comprising:

- a feed table adapted to slidably receive the bottom surface of the piece of lumber along a traveling course;
- at least one planing head extending on a side of the planing course and adapted to plane one of the surfaces of the piece of lumber;
- a linebar projecting on a side of the feed table and adapted to slidably receive one of the side surfaces of the piece of lumber;
- feed rolls extending along the traveling course and adapted to move the piece of lumber along the traveling course;
- positioning means responsive to respective control signals for adjusting a height of the feed table and a planing level of said at least one planing head with respect to said one of the surfaces of the piece of lumber according to the control signals; and
- position encoders respectively coupled to the feed table and said at least one planing head, for producing positional signals indicative of the height of the feed table and the planing level of said at least one planing head.

BRIEF DESCRIPTION OF THE DRAWINGS

A detailed description of preferred embodiments will be given herein below with reference to the following drawings, in which like numbers refer to like elements.

DETAILED DESCRIPTION OF THE PREFERRED EMBODIMENTS

Figure 14:
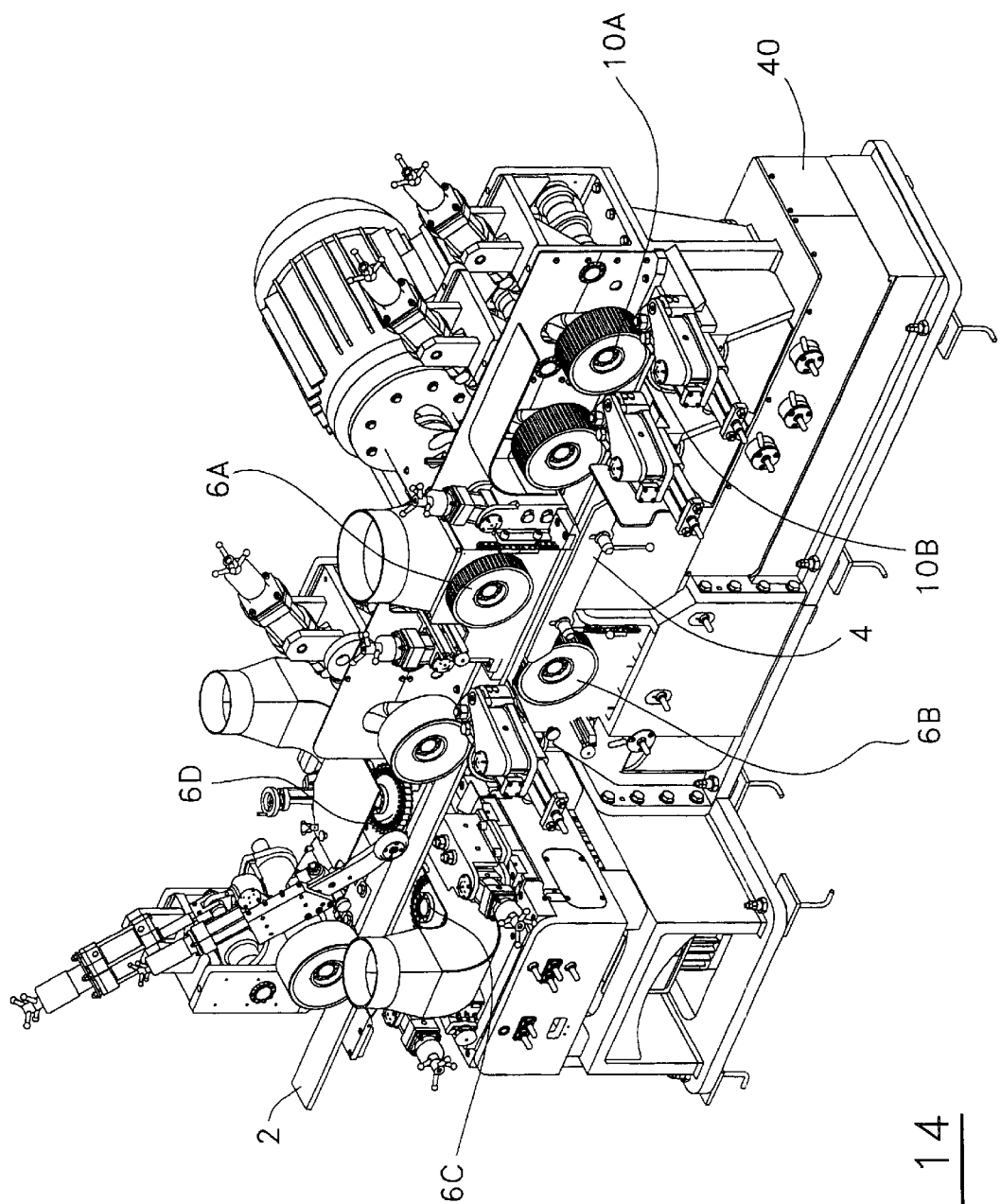
FIG. 14 is a perspective view of a planing machine according to the present invention.

Referring to FIG. 14, there is shown an automated planer machine for planing a piece of lumber 2 having top, side and bottom surfaces.

Figure 1:
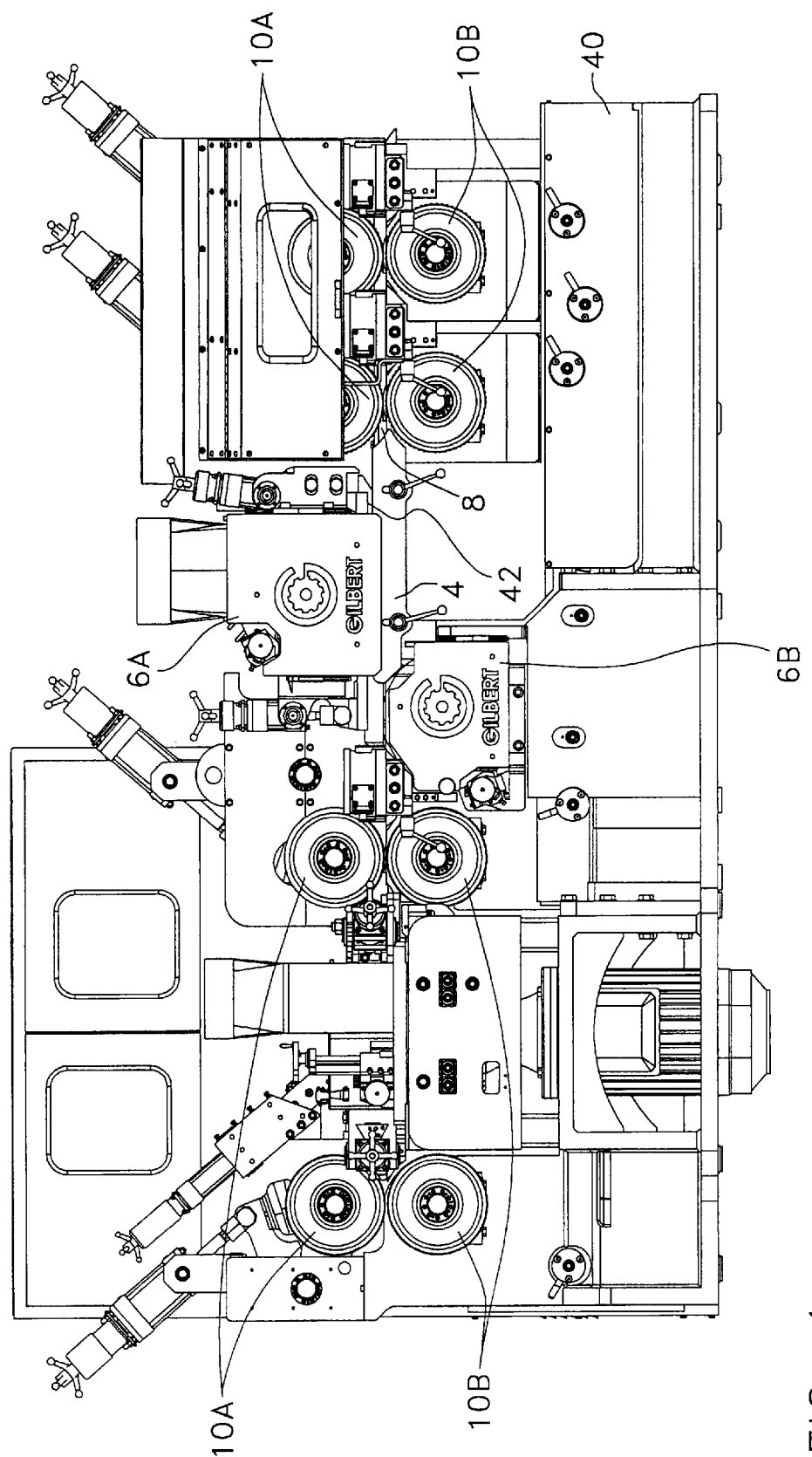
FIG. 1 is a side elevation view of a planing machine according to the present invention.
Figure 2:
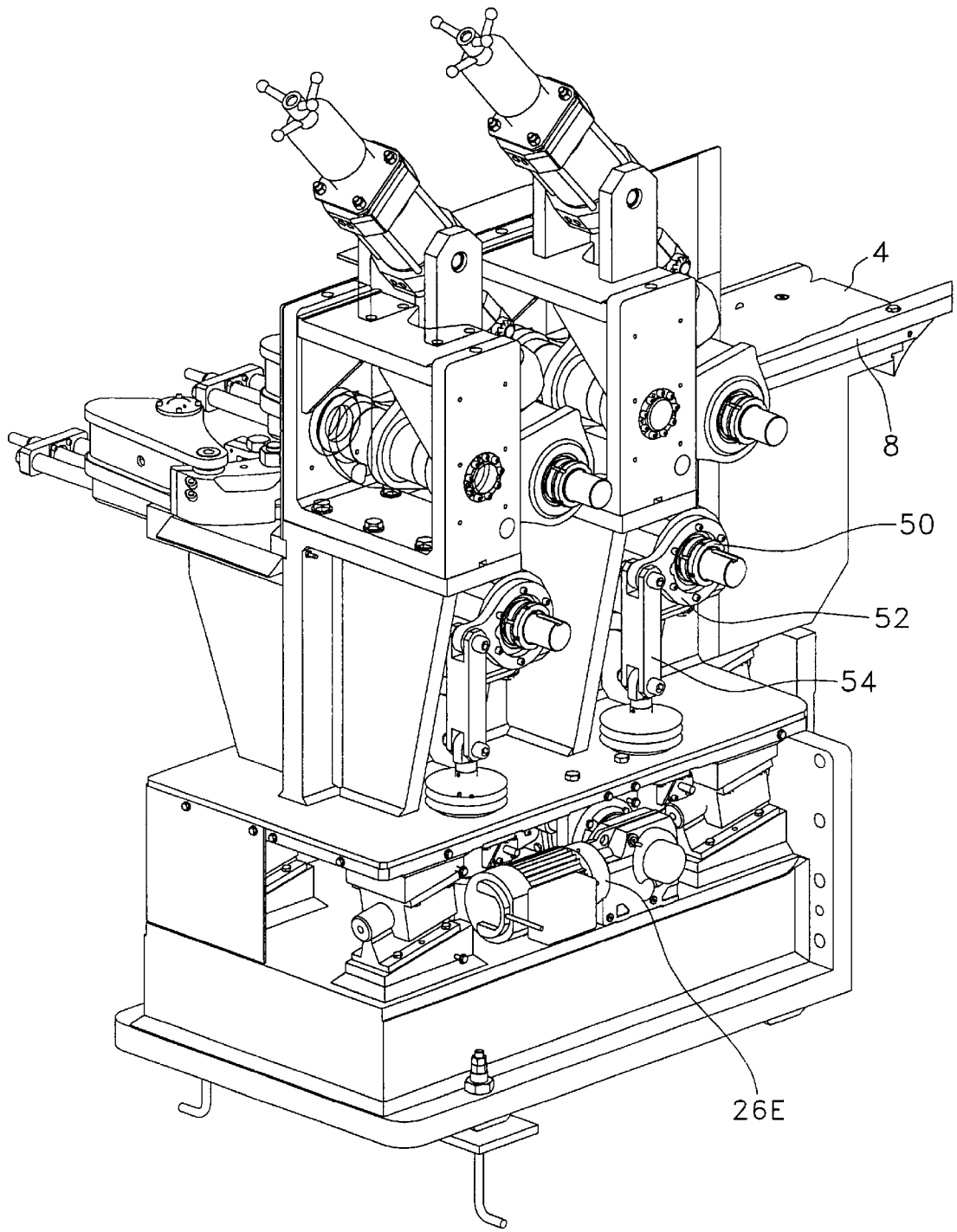
FIG. 2 is a perspective view of an input section of the planing machine with the feed table according to the present invention.

Referring to FIG. 1, the planer machine has a feed table 4 adapted to slidably receive the bottom surface of the piece of lumber along a traveling course which, in the figure, extends from right to left. The planer machine has upper, lower and side planing heads 6A–D (see also FIG. 3) extending on different sides of the traveling course. The upper and lower planing heads 6A–B are adapted to plane the top and bottom surfaces of the piece of lumber 2 respectively, while the left and right planing heads 6C–D are adapted to plane the left and right side surfaces of the piece of lumber 2. Only three or fewer planing heads can be provided in the planer machine if desired.

A linebar 8 projects on a side of the feed table 4 and is adapted to slidably receive one of the side surfaces of the piece of lumber 2 and to provide lateral guidance of the piece of lumber through the planer machine. Feed rolls 10A–B extend along the traveling course and are adapted to move the piece of lumber 2 along the traveling course.

Figure 15:
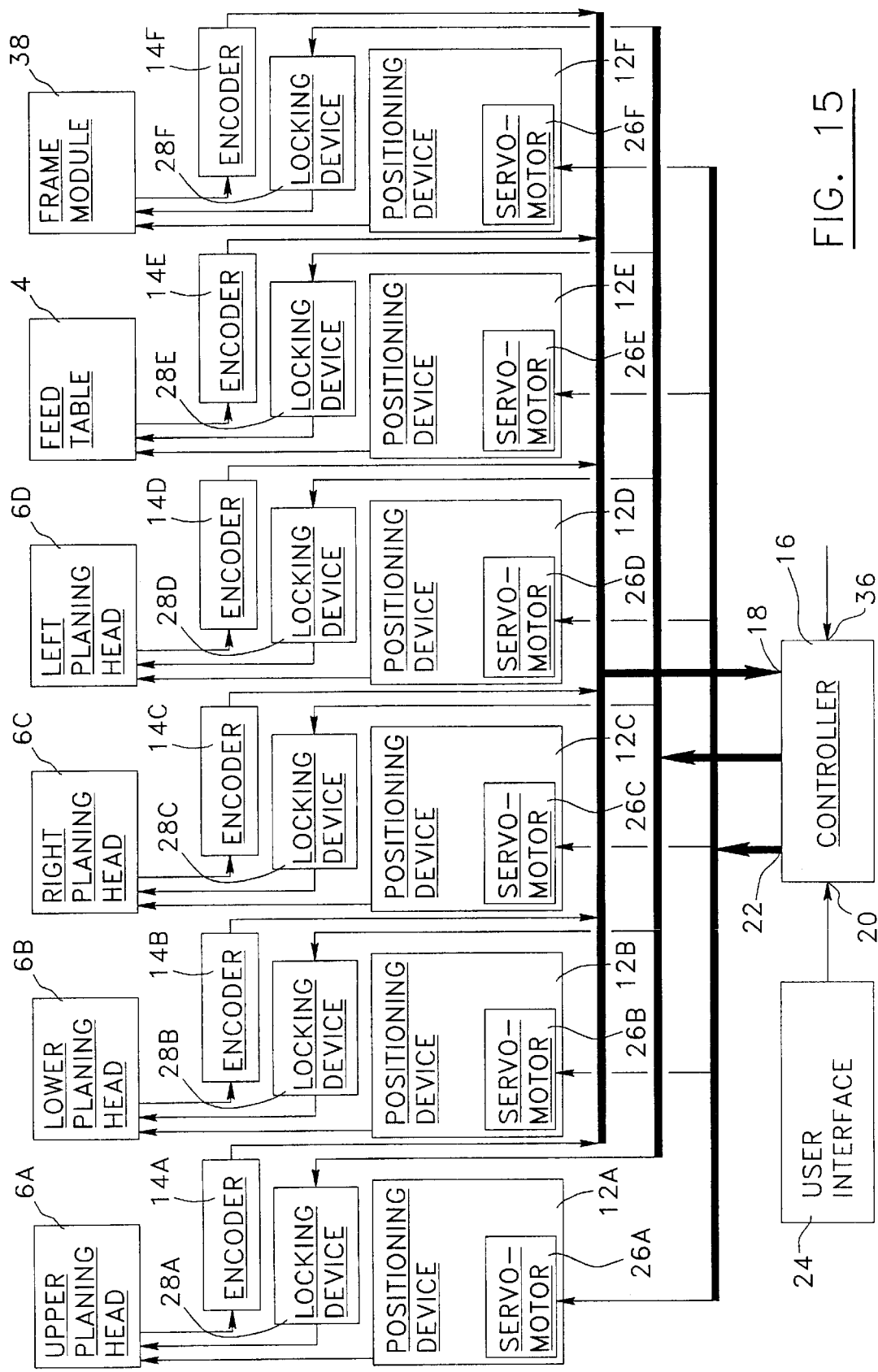
FIG. 15 is a schematic block diagram of a control system in a planing machine according to the present invention.
Figure 16:
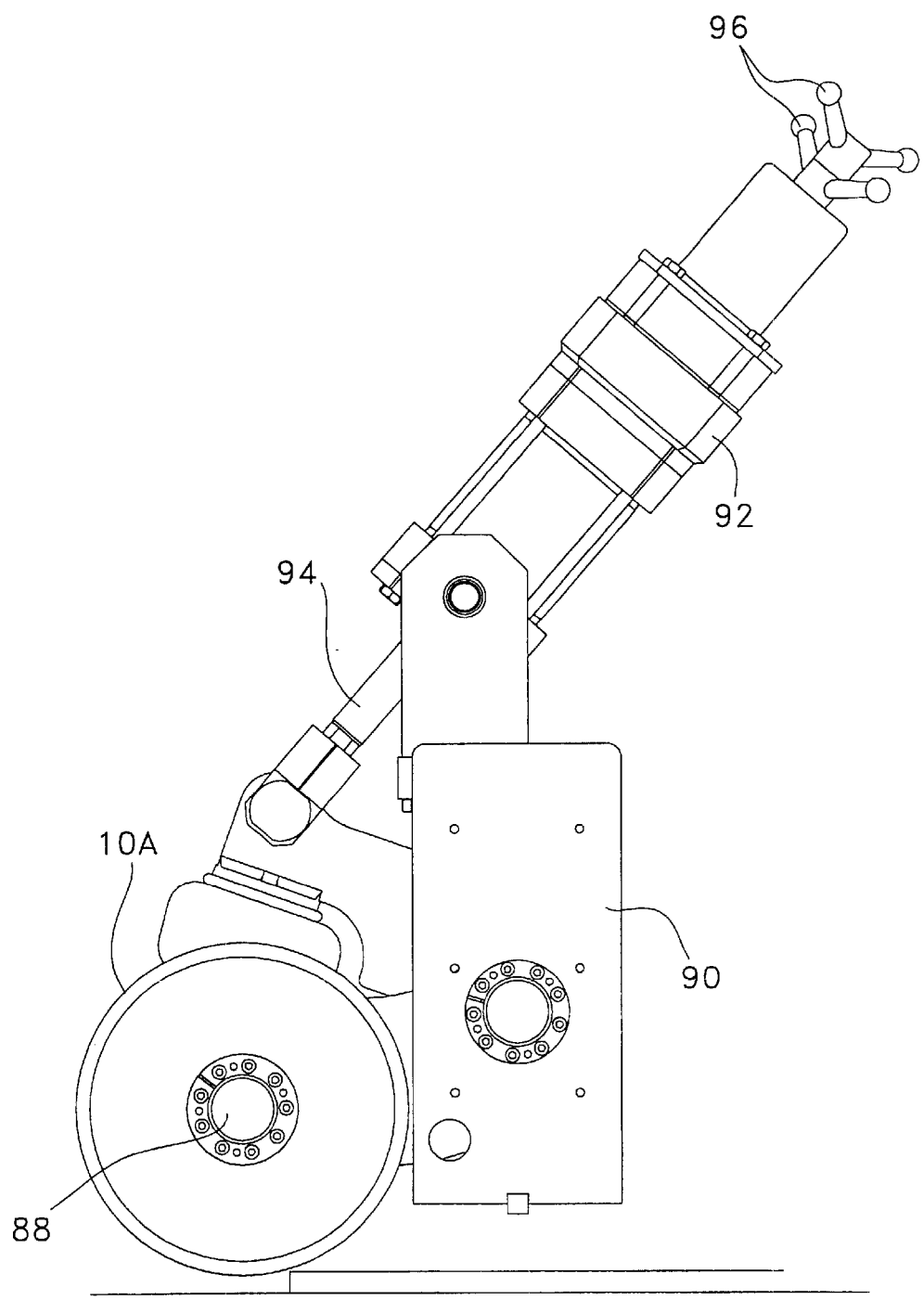
FIG. 16 is a side elevation view of a positioning device for an upper feed roll according to the present invention.
Figure 17:
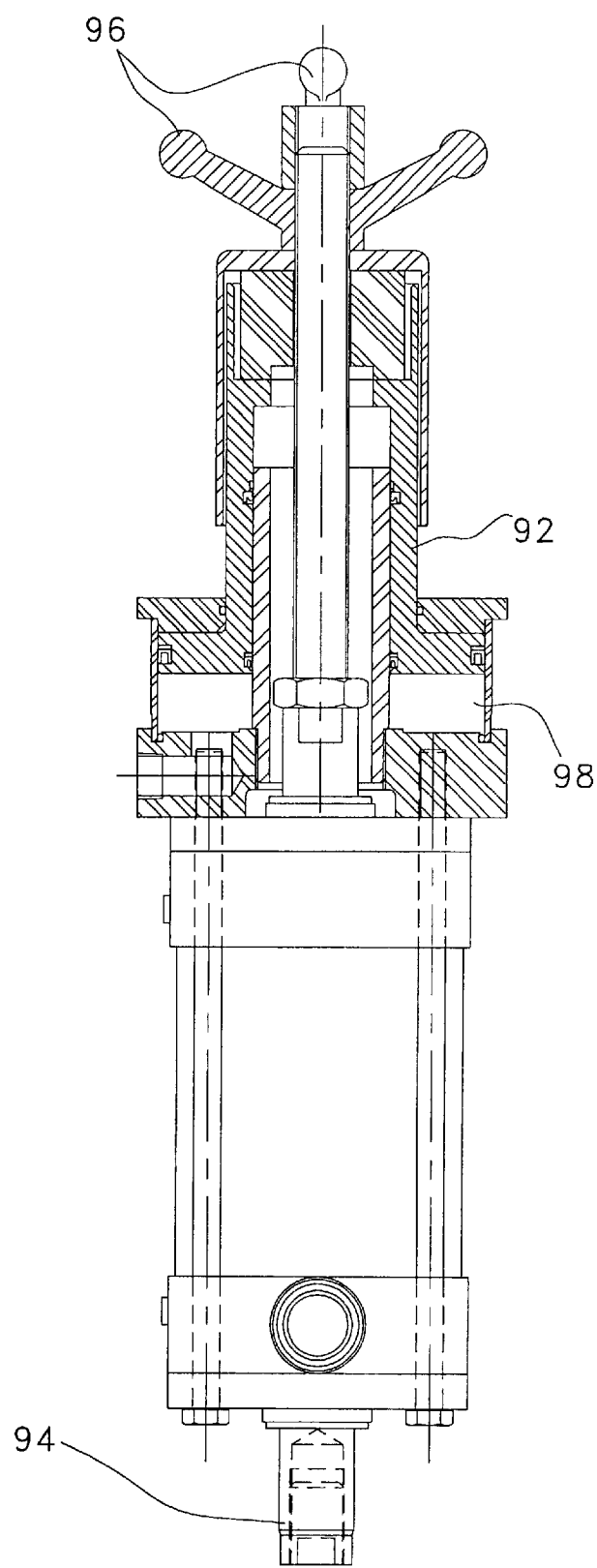
FIG. 17 is a cross-section view of a jack of a positioning device for an upper feed roll according to the present invention.

Referring to FIG. 15, positioning devices 12A–E (as shown also for example in FIGS. 4, 7–9 and 13) and responsive to respective control signals are provided for adjusting a height of the feed table 4 and a planing level of each planing head 6A–D with respect to the respective surfaces of the piece of lumber 2 according to the control signals.

Position encoders 14A–E are respectively coupled to the planing heads 6A–D and the feed table 4 for producing positional signals indicative of the height of the feed table 4 and the planing level of the planing heads 6A–D.

A controller 16 has inputs 18 connected to the position encoders 14A–E, a user control input 20, and outputs 22 connected to the positioning devices 12A–E and producing the control signals as a function of the positional signals and user settings received by the inputs 18 and 20. The controller 16 may be integrated in the planing machine or provided as a separate unit connectable to the planing machine.

Adjustment of the planing heads 6A–D and of the feed table 4 can be automatically achieved with the assistance of the controller 16. The operator of the machine is provided with an interface 24 on which the various functions of the planing machine are displayed. The operator can move various if not all the components of the machine using his/her fingers. Special functions may be implemented in the controller 16 to allow the operator to move simultaneously several components. These functions are particularly appreciated and used when a piece is jammed in the machine. A sequence is then initiated to raise all the components in contact with the piece and to allow its evacuation by means, and only, of the components deemed necessary. The manual actions that an operator is used to execute can be automatically reproduced, individually or simultaneously, by the controller 16. The manual interventions are thus almost non-existent.

The settings are fast, accurate and very easy to obtain since the exact and real positions of the components are known at any time by means of the encoders 14A–E. The down times cannot be completely eliminated because there will always be unexpected events during operation (broken or jammed pieces) but these down times will now on be very short so that financial losses will be considerably reduced.

The controller 16 allows the automated displacement of the planing heads 6A–D.

The controller 16 also allows a management of all of the pneumatic components in the machine.

Servo-motors 26A–E are used to actuate the components in rotation (for example through positioning screws) for the displacement of the planing heads 6A–D and of the feed table 4.

The encoders 14A–E are preferably digital encoders like the linear encoders manufactured by the company Heidenhain, which provide direct readings. The real vertical positions of the upper and lower planing heads 6A–B and of the feed table 4 and the lateral positions of the side planing heads 6C–D can thus be known at any time. For example, during a power breakdown, the encoders 14A–E permit to instantaneously know the positions of the components as soon as the power comes back again. Such a type of encoders 14A–E also allows to preserve the machining accuracy even if the; mobile components have accumulated wear.

Hydraulic or other suitable kinds of locking devices 28A–E are provided to immobilize the cutting tools (planing heads 6A–D) and the feed table 4 in work position.

The automated positioning system of the machine comprises the controller 16, the servo-motors 26A–E, the digital encoders 14A–E and the locking devices 28A–E.

The controller 16 receives the information signals from the encoders 14A–E and from the operator. It activates the servo-motors 26A–E driving the positioning devices 12A–E for moving the planing heads 6A–D and the feed table 4 in the desired positions. It also operates the hydraulic locking devices 28A–E.

Each one of the planing heads 6A–D and the feed table 4 moves along an axis. The controller 16 may manage several if not all of the axes individually or simultaneously. The number of axes is theoretically unlimited but, as a general rule, five axes provide good control of the operation of the planing machine. An optional sixth axis can be provided for piece by piece optimization as described hereinbelow. The controller 16 may be deactivated to allow manual displacements of the axes. The functions of the controller 16 are also unlimited. Various basic functions are implemented, and additional new functions can be easily integrated by the client. For example, when the machine does not respect the desired dimensions, calibration of the planing heads 6A–D can be performed by entering measured values of the non-conformed machine piece. The controller 16 will then proceed on a differential basis between the anticipated values and those obtained and will automatically position the planing heads 6A–D to obtain the new desired dimensions.

Another interesting function is when a piece jams in the machine and the operator wants to free it. It is then possible to control the movements of all of the components in direct contact with the piece of lumber 2, thereby allowing the operator to free the piece without having any physical contact with it. The controller 16 is capable to reproduce the operations normally performed by an operator in such a case. The operator only needs to press a button (not shown in the figures) which initiates a sequence of operations identical to what he/she would have done manually. Once the piece is freed, the operator only has to press for example the AUTO function of the machine and the planing heads automatically get back to their initial positions to resume production.

As a result, the planing machine is much safer since direct physical interventions from the user are minimized.

Lateral waning can be corrected by means of two buttons, one for left wane, and one for right wane. Depending on the selected choice, the controller 16 may command each time a displacement of both side planing heads 6C–D by 0.002", either on the left or on the right. For example, to move the side planing heads 6C–D by 0.010", the operator must press the appropriate button five times, and the controller 16 will simultaneously move the planing heads 6C–D by 5×0.002" once the value will be confirmed for example by pressing the AUTO function. The 0.002" indexation is configured through the user interface 24 but it can be different according to the needs. To correct upper and lower waning, the controller 16 will vertically move the feed table 4 according to the desired indexation in a similar manner as for lateral waning.

The encoders 14A–E directly read (without any mechanical intermediary) the positions of the planing heads 6A–D and of the feed table 4, thereby allowing to obtain a great accuracy and an unequaled reproducibility. Such encoders 14A–E are perfectly adapted for used planing machines. Despite wear of the mechanical components for the displacement of the axes, the controller 16 will always position them with the same accuracy. The controller 16 may detect with the encoders 14A–E, if necessary, an axis displacement during full production, deactivate the hydraulic locking devices 28A–E, reposition the components and reactivate the hydraulic locking devices 28A–E without stopping the production.

The servo-motors 26A–E produce rotation of driving screws or other suitable driving mechanisms used to move the planing heads 6A–D and the feed table 4. Each servo-motor 26A–E can be formed of an electric motor provided with a gearbox and combined to a transmission and to an encoder. The servo-motors 26A–E are controlled by servo-amplifiers which convert the control signals produced by the controller 16 into electric pulses (voltage) to allow speed variation of the servo-motors 26A–E. The servo-motors 26A–E are provided with encoders which compute the number of turns completed by the electric motors in order to validate the information provided by the servo-amplifiers. When the components, in particular the drive screws, accumulate wear, the servo-motors 26A–E cannot alone ensure accuracy of the displacements because they cannot detect the real linear motion as the additional digital encoders 14A–E do.

To prevent any displacement of the planing heads 6A–D and the feed table 4, the controller 16 manages the operation of pneumatic amplifiers which produce hydraulic pressure in the mechanical locking devices 28A–E. The pneumatic amplifiers can contain approximately two liters of oil and are supplied with compressed air.

Figure 4:
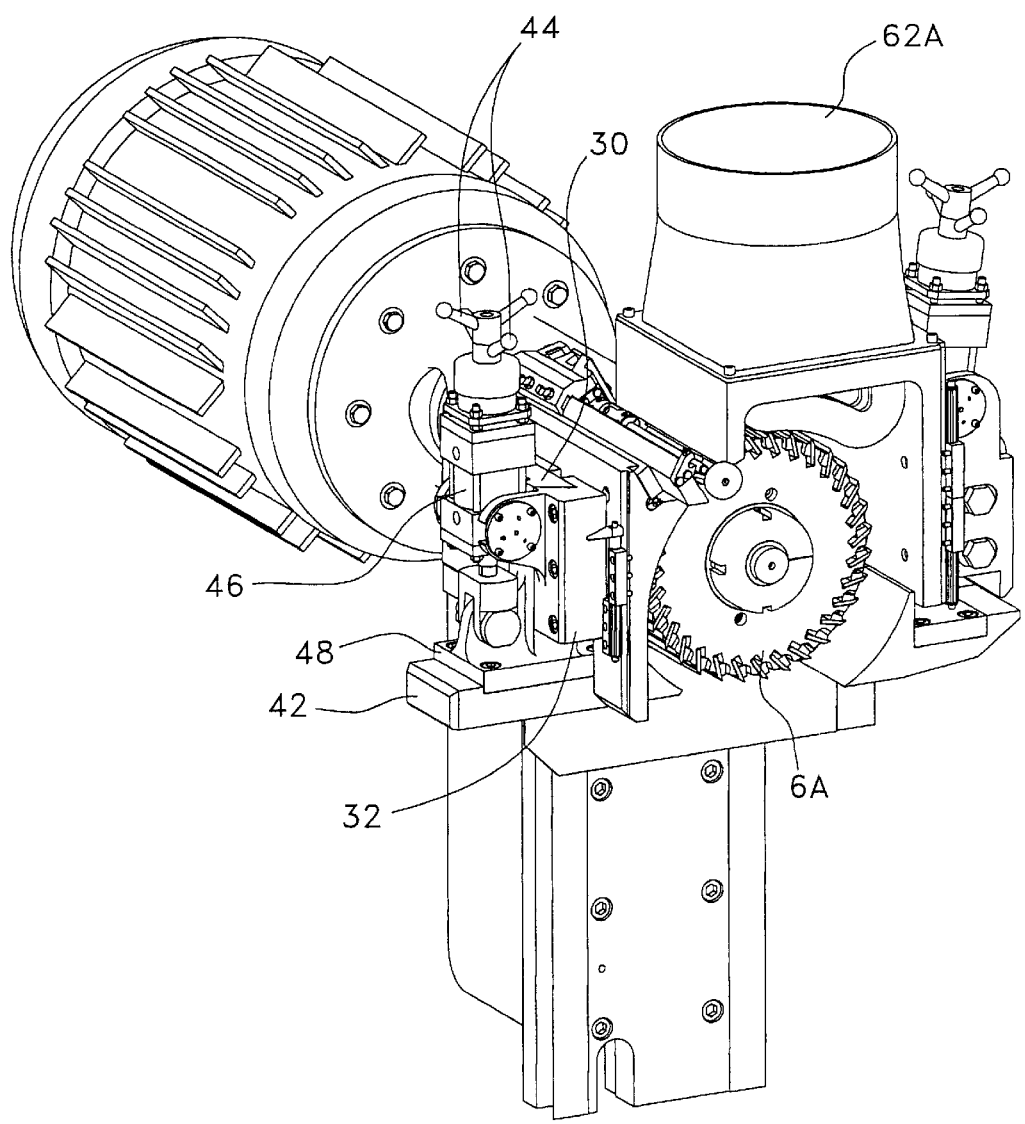
FIG. 4 is a perspective view of an upper planing head and a pressure foot according to the present invention.
Figure 5:
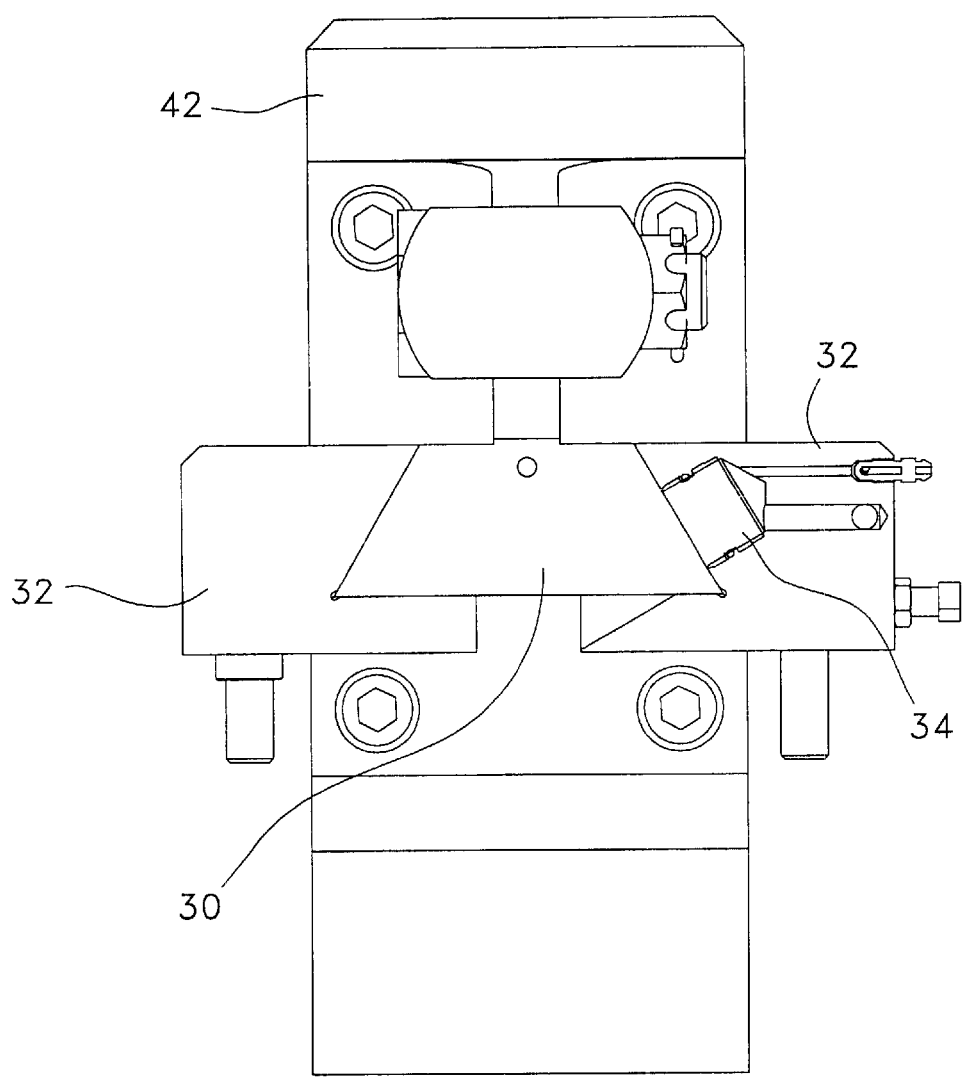
FIG. 5 is a partial cross-section view of a sliding arrangement of the pressure foot according to the present invention.
Figure 6:
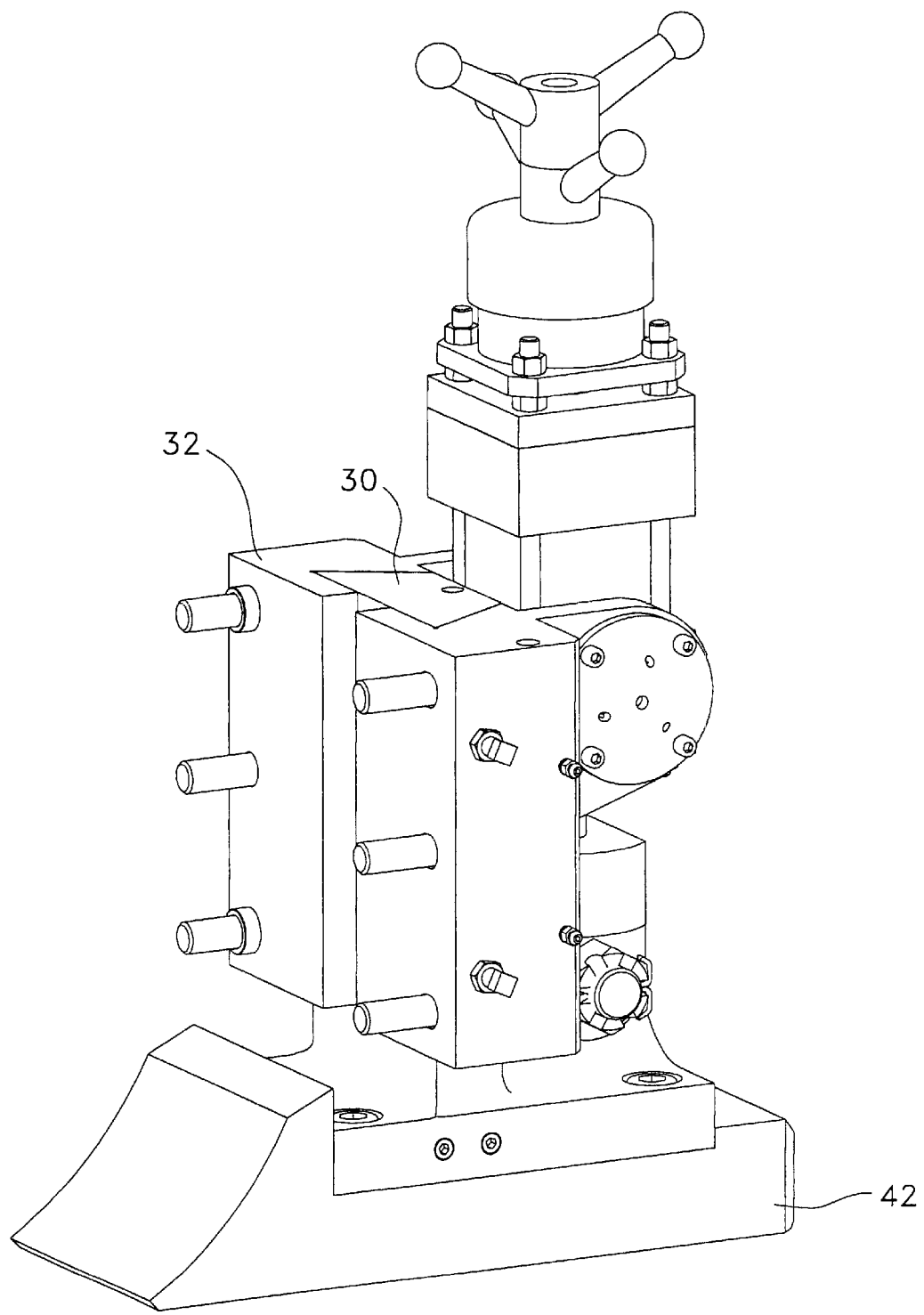
FIG. 6 is a perspective view of a pressure foot for a planing machine according to the present invention.
Figure 7:
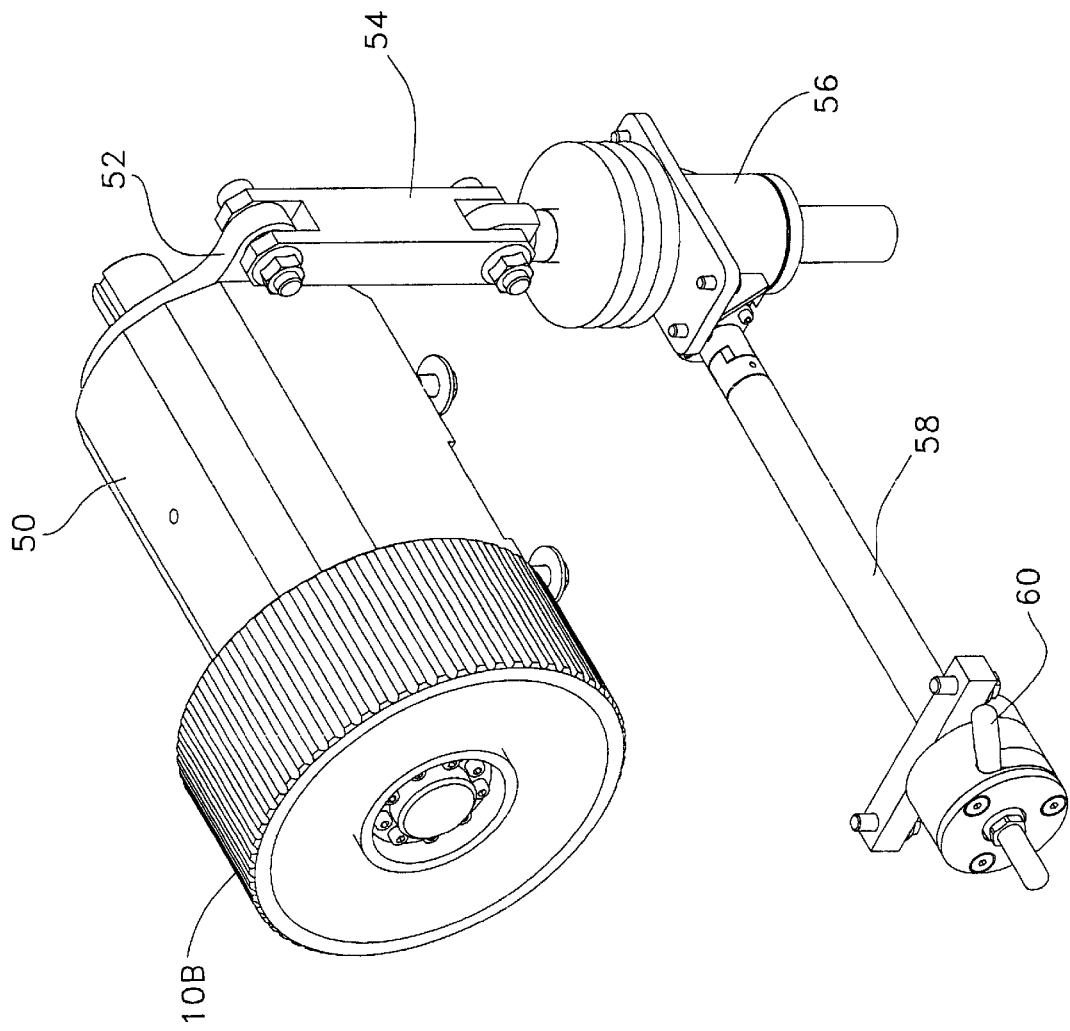
FIG. 7 is a perspective view of a positioning device for a lower feed roll according to the present invention.
Figure 8:
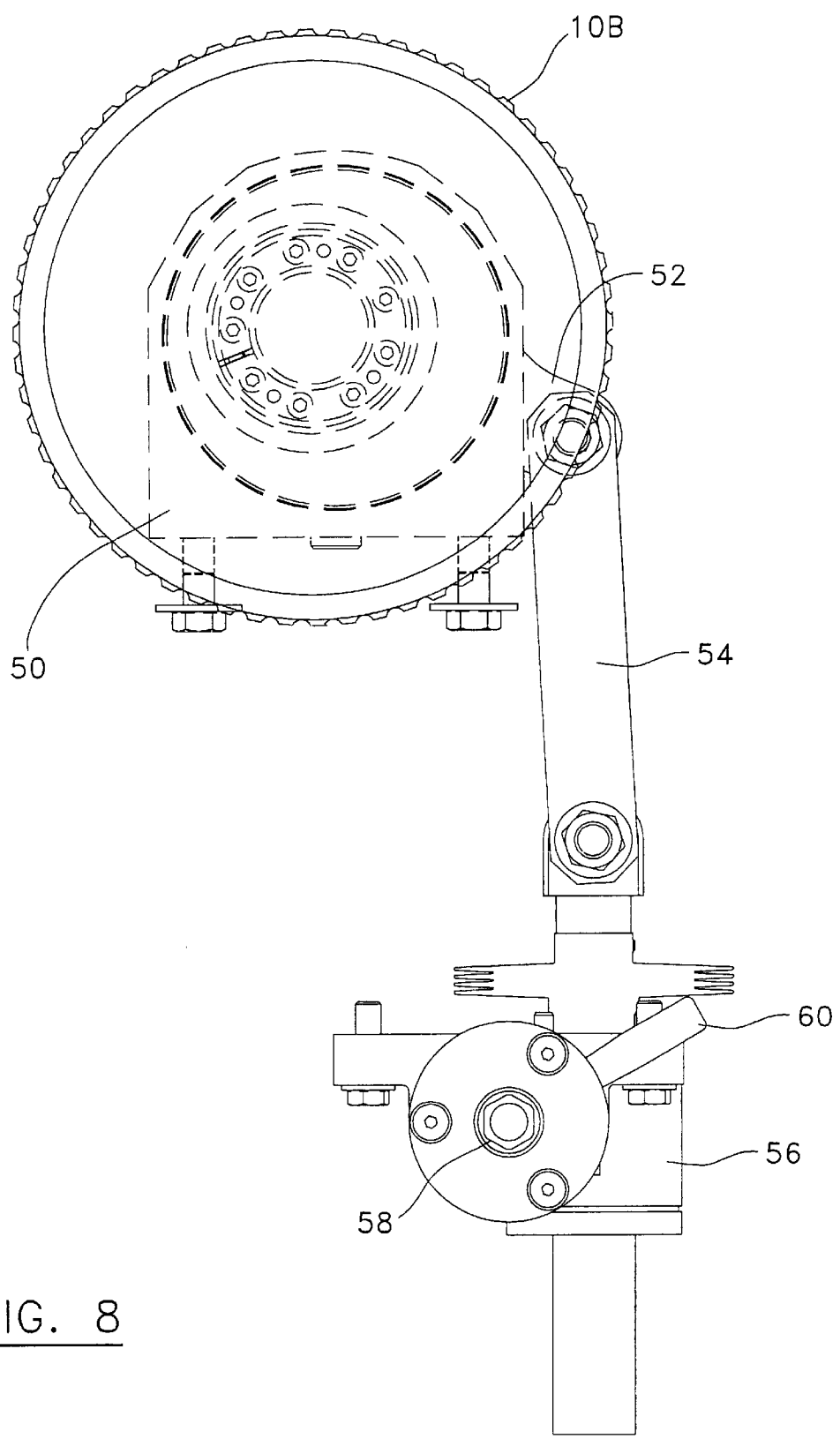
FIGS. 8 and 9 are side elevation views of the positioning device for a lower feed roll in retracted and extended positions respectively, according to the present invention.

Referring to FIGS. 4–6, the mechanical locking devices 28A–E can be made of male and female dovetail members 30, 32 combined to a small piston system 34 (see for example FIG. 5) for the purpose of receiving fluid under pressure for locking of the dovetail members 30, 32 together.

Once a displacement of the axes is necessary (for example, for automatic release operation), the controller 16 automatically deactivates the locking devices 28A–E to allow the axes to move freely. Once the desired displacement is finished, the controller 16 automatically reactivates the pneumatic amplifiers to immobilize the axes in working position.

The machining quality of the pieces of lumber is an element which determines their grade and their retail price. Automated management of waning defects permits to eliminate the machining defects at the source and is a very desirable feature for the planing industry since it represents significant additional incomes.

The automated management of waning defects consists in implementing a communication between the optical reader (not shown) performing the grading of the pieces at the output of the planing machine and the controller 16. Most of the planing mills already use such an equipment (optical reader) to verify the quality of the processed wood and to proceed with its grading. Each piece is analyzed under all of its angles and graded according to its state. This equipment is commonly called an optimizer. By ensuring a constant communication between the optimizer and the controller 16, which is provided with an input line 36 for this purpose, the controller 16 may correct immediately, when detected, the presence of waning or machining defects. As soon as the optimizer reports a repetitive defect on the pieces, the controller 16 immediately reacts and commands the displacement of the planing heads 6A–D and/or of the feed table 4 in order to correct this defect. No intervention from the operator is necessary. Everything is done automatically.

The automated piece by piece optimization consists in performing an analysis of the raw piece before its input in the planing machine. The optical reader is then located upstream from the planing machine and provides the controller 16 with the required information for proceeding with an analysis of the data provided by the reader and to command displacement of the planing heads 6A–D to the best positions for an optimal use of the primary matter and this, for each piece.

Figure 3:
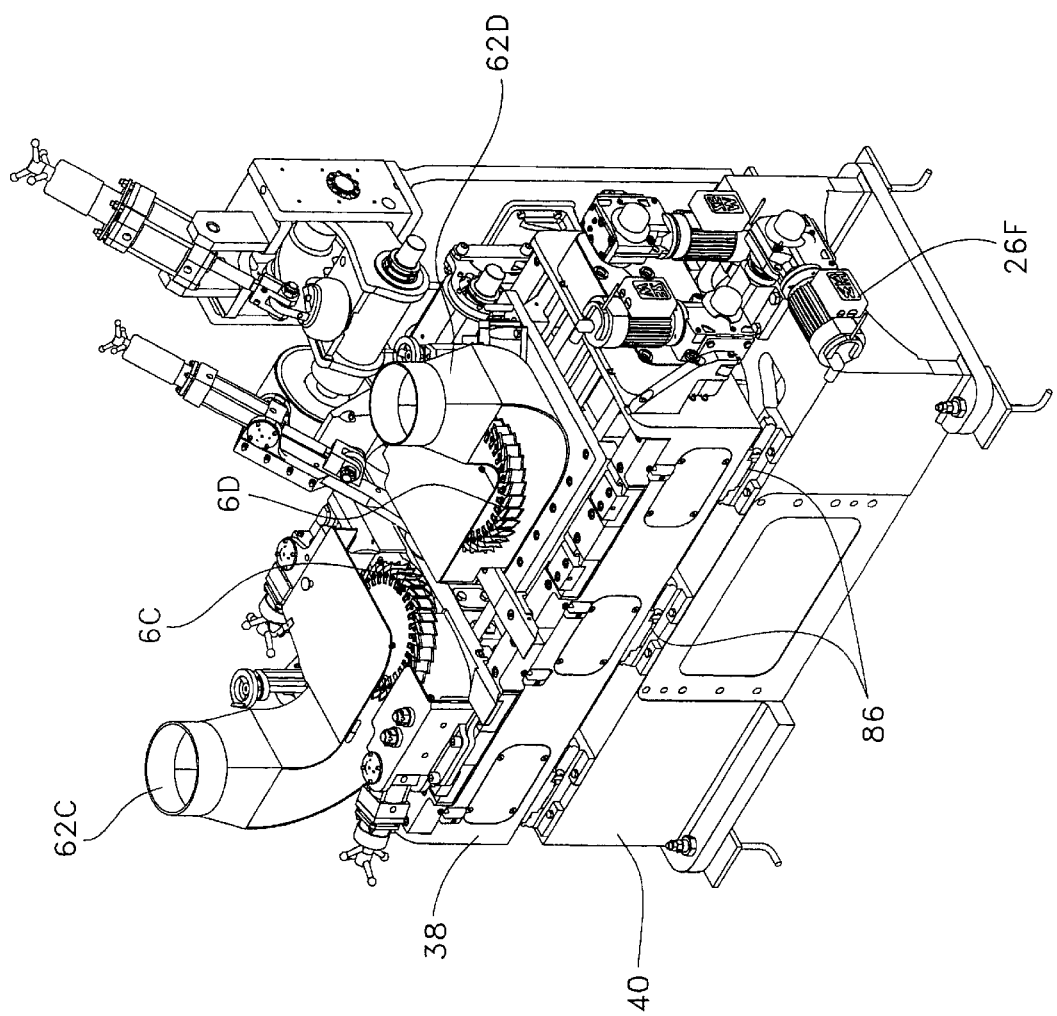
FIG. 3 is a perspective view of a laterally sliding frame module of a planing machine according to the present invention.

Referring to FIG. 3, to perform optimization in an efficient way, the planing machine can be provided with a sixth axis for the simultaneous displacement of the side planing heads 6C–D thus grouped on a same frame module 38. The purpose of such a module 38 is to allow the immobilization of the side planing heads 6C–D by means of the mechanical locking devices 28C–D as before, and to move this new module 38 as a whole.

The side planing heads 6C–D have a structure such that they can move individually or simultaneously, in response to the control signals produced by the controller 16. The piece by piece automated optimization system is designed so that the side planing heads 6C–D can move individually or simultaneously on the module 38 independently from the main frame 40 of the machine. The module 38 is arranged to move laterally on the main frame 40, for example using linear slides 86, and the control of its displacements is made through the sixth axis, which is provided with a positioning device 12F having a servo-motor 26F, a locking device 28F and an encoder 14F (see FIG. 15). The side planing heads 6C–D can thus move individually or simultaneously on the module 38 and are immobilized in place by the mechanical locking devices 28C–D. Furthermore, they can move simultaneously by displacing the module 38 across the main frame 40 using the sixth axis.

In this operation mode, the axes of the planing machine are positioned at each piece of lumber. As a first step, the controller 16 positions the feed table 4 by means of the servo-motor 26E. The height of the feed table 4 determines the vertical position of the piece of lumber 2 in the planing machine. Depending on the position, the machining will be more pronounced on one surface or the other to optimize the use of the primary matter. Secondly, the controller 16 positions the two side planing heads 6C–D simultaneously using the sixth axis through the module 38. The sixth axis represents the displacement of the mobile frame module 38 on which both side planing heads 6C–D and their components are assembled. The servo-motor 26F and the digital encoder 14F combined to the controller 16 ensure the displacements of the mobile frame module 38.

Referring to FIG. 14, the feed rolls 10A, 10B, the planing heads 6A–D and the feed table 4 are preferably mounted on the main frame in a cantilevered arrangement. This design offers better access to the piece of lumber 2. The down times due to jams of the pieces are considerably reduced since access to them is considerably facilitated. The cantilevered design also provides a better access for the general maintenance of the machine.

Referring to FIGS. 4–6, the machine has an upper pressure foot 42 extending over the feed table 4 and adapted to press against the top surface of the piece of lumber 2 when the piece of lumber 2 slides on the feed table 4. The purpose of the pressure foot 42 is to prevent the piece of lumber 2, during its machining, from raising on the feed table 4 so as to ensure its perfect planeness after the machining operation. The pressure foot assembly has height adjustment levers 44 and a pneumatic jack 46 for quick removal of the pressure foot 42 in the event of a jam. The mounting frame 48 of the pressure foot 42 slides between a two-piece base frame 32 as a result of the dovetail shape of the pieces. The pieces of the base frame 32 are arranged so that assembly of the pneumatic jack 46 and of the mounting frame 48 with the pressure foot 42 is easy. One of the pieces of the base frame 32 is preferably laterally adjustable for adjusting the internal play of the dovetail arrangement. Pistons 34 (see FIG. 5), operated by hydraulic pressure, are used to immobilize the pressure foot 42 and to prevent any undesirable vertical movement. The high pressure of the pistons 34 on the dovetail arrangement increases the friction between the pieces thereby causing their immobilization.

Referring to FIGS. 1, 2, 7–9, the adjustment of the lower feed rolls 10B can help reducing the friction of the piece of lumber 2 on the feed table 4, so their proper adjustment causes the machine to generate less heat. The accuracy of this adjustment is thus important.

Figure 9:
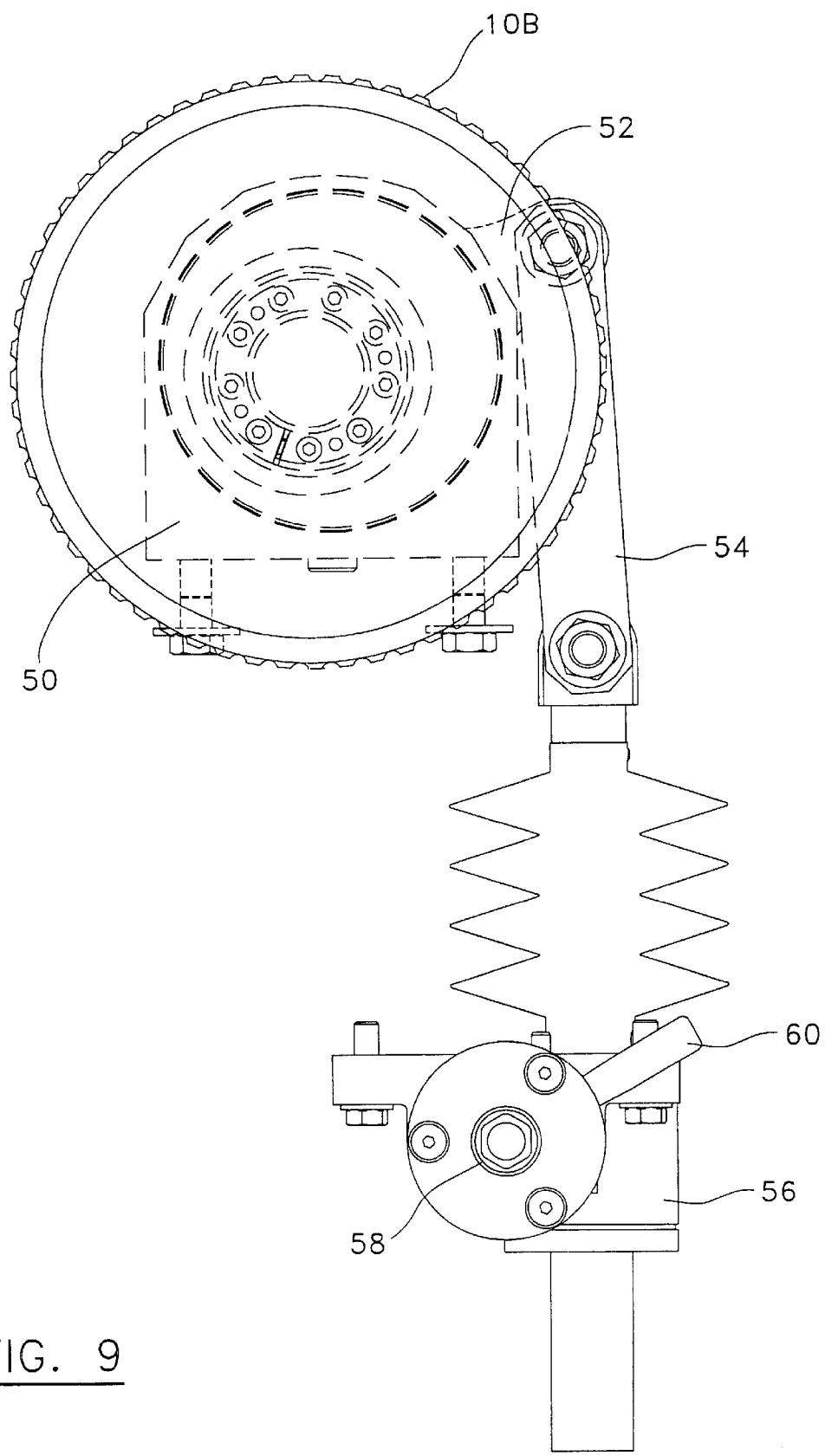

Each lower roll module can advantageously be made of a roll 10B, an eccentric roller bearing cage 50, two levers 52, 54, a screw jack 56, a drive shaft 58 and a locking mechanism 60 to prevent rotation of the shaft 58. As shown in FIG. 9, when the module is actuated, the screw jack 56 vertically moves the primary lever 54. The primary lever 54 produces a rotational movement of the secondary lever 52 which is secured to the eccentric roller bearing cage 50. The eccentricity of the cage 50 causes the roll 10B to move vertically.

Referring to FIGS. 1, 2, 16 and 17, each upper roll module can advantageously be made of a roll 10A, a bearing member 88 onto which the roll 10A is rotatably mounted, a support 90 pivotally holding the bearing member 88, and a jack 92 mounted on the support 90 and having a movable arm 94 pivotally connected to the bearing member 88 and a pressure cushion chamber 98 within the jack 92 for absorbing hits transmitted to the movable arm 94 by the bearing member 88 when, for example, a knot projecting from the top surface of the piece of lumber 2 passes under the roll 10A. The jack 92 may be provided with height adjustment levers 96 for manual adjustment.

The adjustments of the upper and lower rolls 10A–B are preferably made automatically by the controller 16 (shown in FIG. 15), especially for piece by piece optimization. The above construction of the upper roll modules reduces the stress on the pieces and the vibration level, with a superior driveability (less bouncing) as a result of the cushioning capabilities of the jacks 92.

Figure 10:
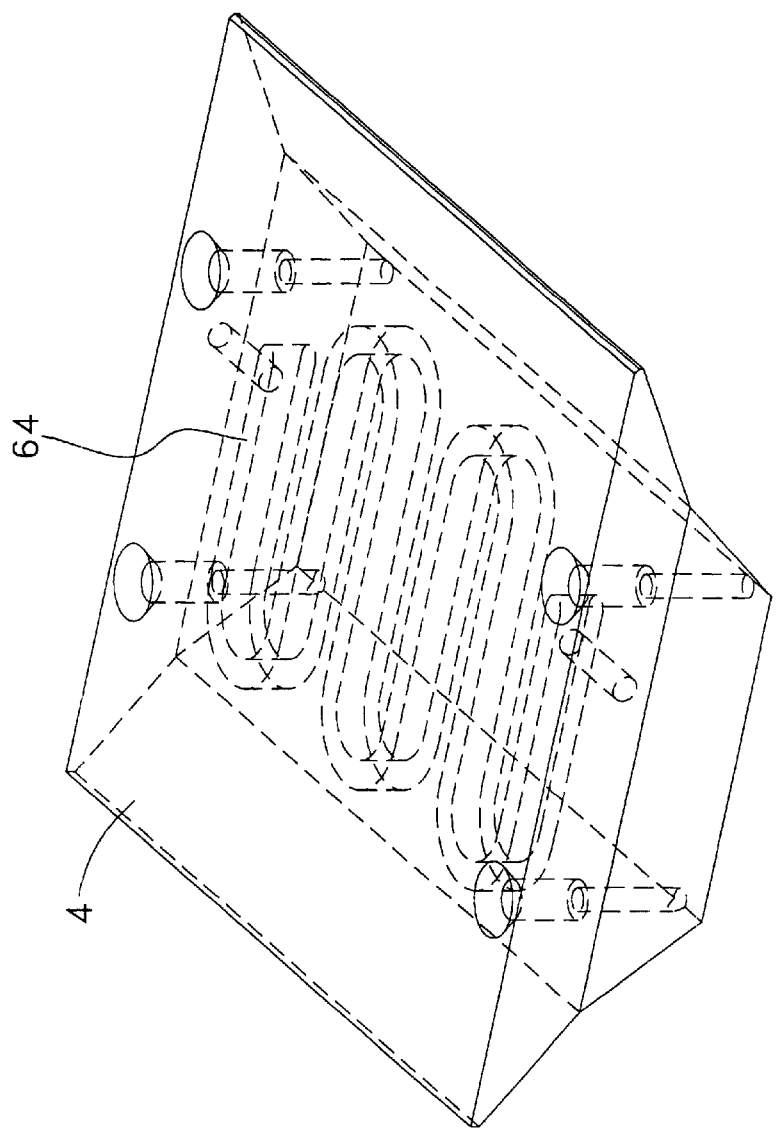
FIG. 10 is a perspective view of a feed table provided with cooling pipes according to the present invention.
Figure 11:
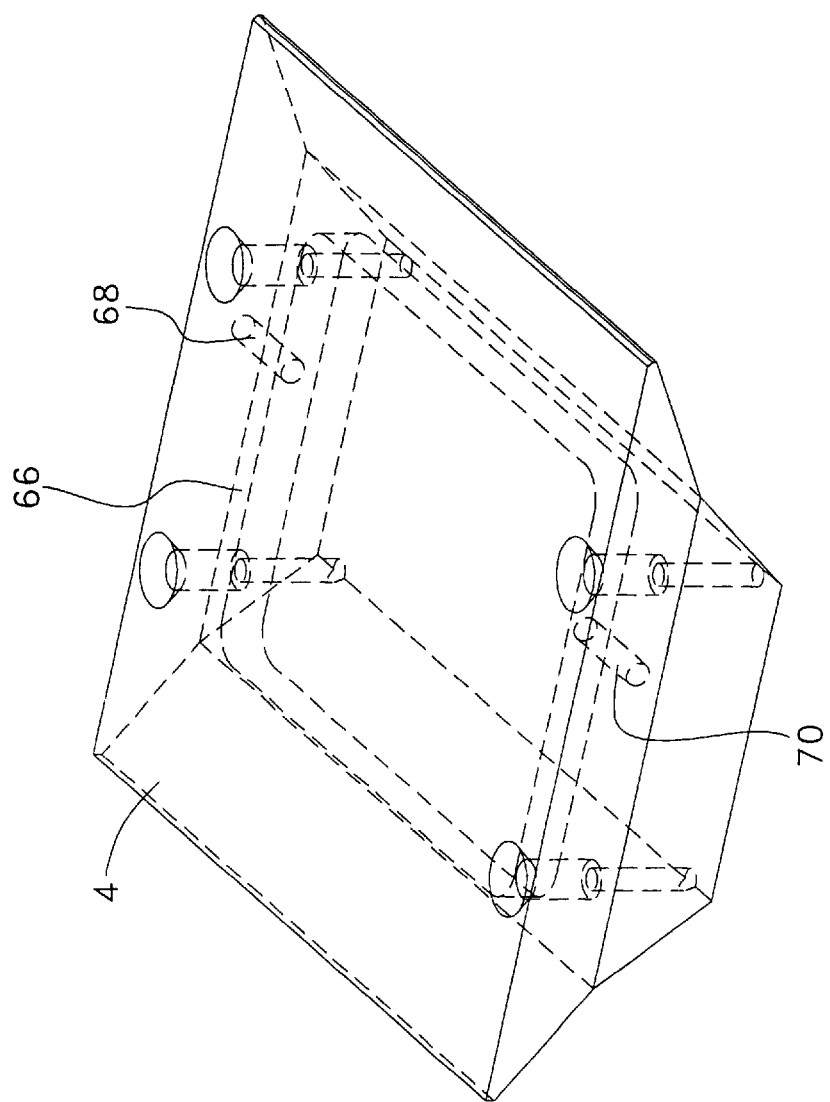
FIG. 11 is a perspective view of a feed table provided with a cooling sink according to the present invention.

Referring to FIGS. 1, 10 and 11, the alignment of the piece of lumber 2 in the planing machine is achieved with components subjected to a very high friction coefficient. The components (lateral linebar 8, feed table 4 and pressure foot) are usually subjected to a chrome treatment to improve their durability. Since the lateral linebar 8 is the most solicited one, a water pipe system in it allows circulating water to cool it down and to reduce the risks of overheating and perhaps of fire. The planing machine according to the invention allows a supply speed (3 000 pi-min) much more higher than in conventional planing machines, thus the risk of overheating is omnipresent. The heat is such that it may cause fire in the machine. With the potentially powerful chip blowers connected to the blower conduits 62A, C–D (see FIGS. 3 and 4), the risk that the fire propagates to the chip storage zone is a major problem. For this purpose, the planing machine proposes individual cooling by water circulation in coolant lines passing through each of the components subjected to friction. The cooling system can have a pipe configuration 64 allowing water circulation over the whole surface of the piece as shown in FIG. 10. Other designs are possible, such as a water sink 66 with an inlet port 68 and an outlet port 70 for coolant circulation. The cooling system is like the blood system for the planing machine.

Figure 12:
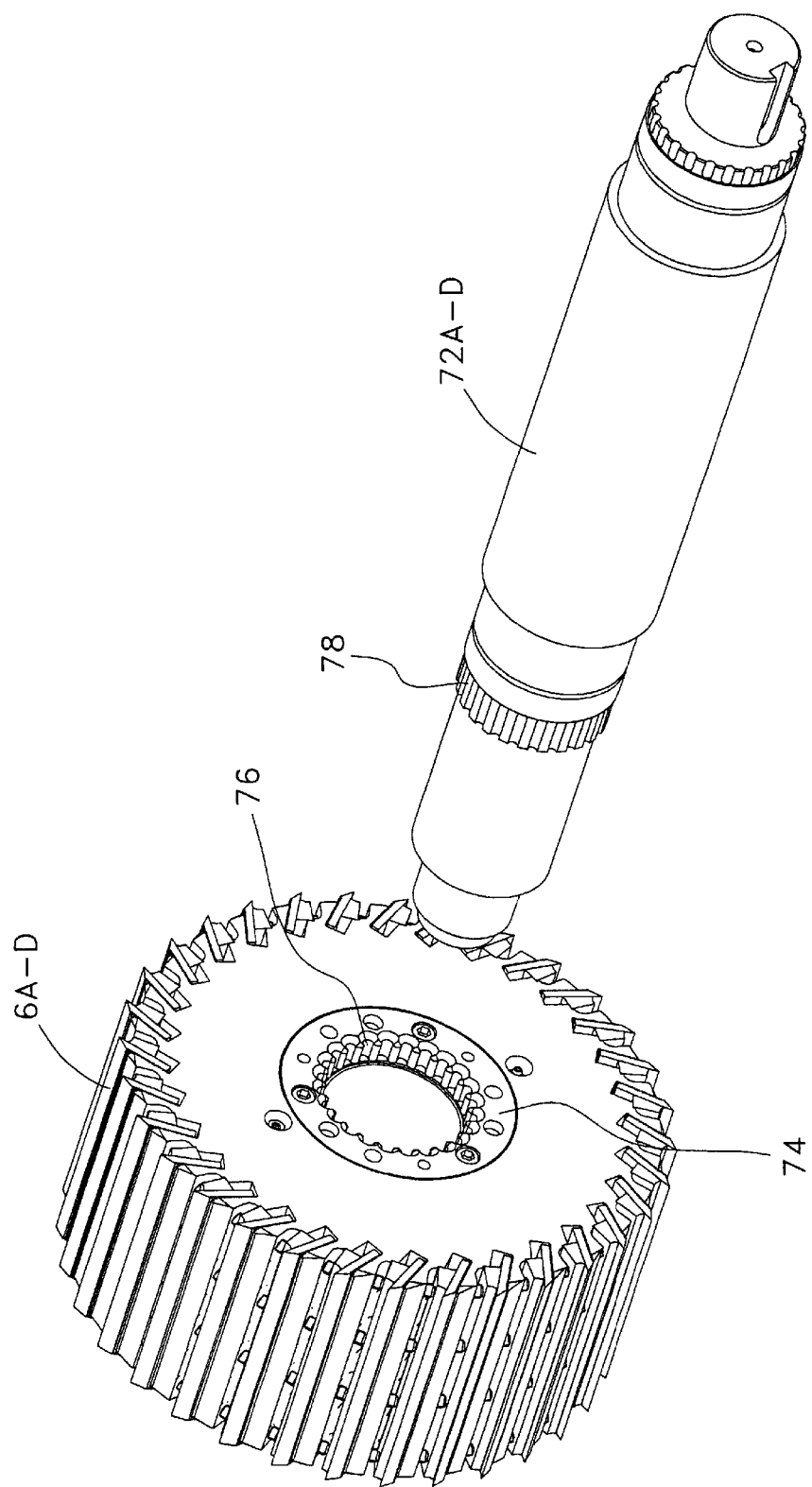
FIG. 12 is a perspective view of a coupling arrangement between a planing head and a drive shaft according to the present invention.

Referring to FIG. 12, the assembly of the planing heads 6A–D with the respective drive shafts 72A–D is preferably made with a fastening system called hydro-grip (trademark) which consists in producing a pressure of grease in an interchangeable sleeve bushing 74 having thin walls. The uniform deformation of the walls of the bushings 74 ensures an auto-centering of the drive shafts 72A–D with the planing heads 6A–D. The torque is transferred from the drive shafts 72A–D to the heads 6A–D by friction between the components. As such, the system is excellent to center the components but when a pressure loss happens during the machining operation, the planing heads 6A–D slip on the drive shafts 72A–D and cause overheating of the components until they merge and a jamming phenomenon appears. In such a case, the damages to the components are irreversible.

In addition to the hydro-grip system, gear teeth 78 outwardly projecting around the shafts 72A–D in engagement with gear teeth 76 inwardly projecting from the bushings 74 extending at centers of the planing heads 6A–D are preferably provided. When the assemblies are completed, the possibility that the planing heads 6A–D may turn and jam on 69 the drive shafts 72A–D is eliminated.

Figure 13:
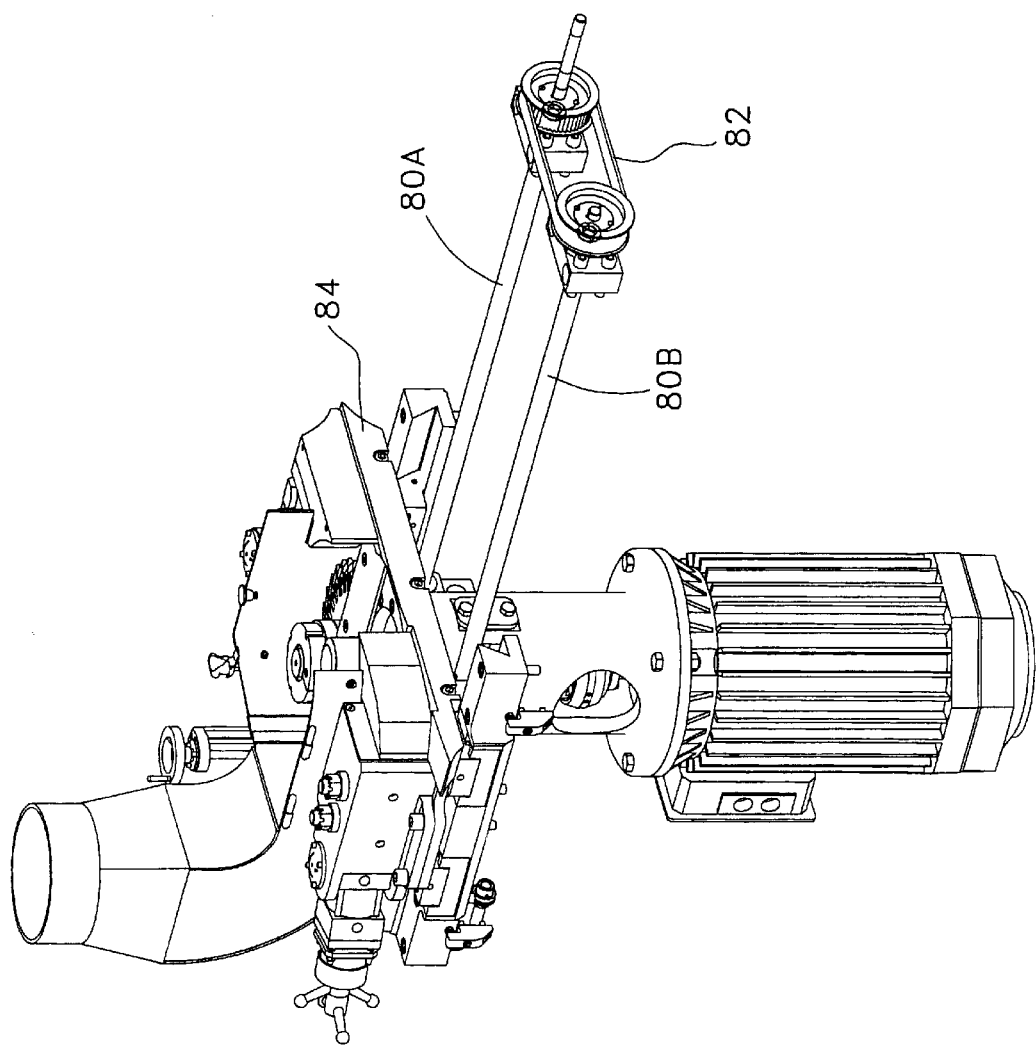
FIG. 13 is a perspective view of a lateral planing head provided with a twin screw positioning device according to the present invention.

Referring to FIG. 13, conventional planing machines use transmission systems with a single screw offset with respect to the axis of the side planing heads to move them. This offset makes the displacement more difficult, inaccurate and increases the wear of the components. The required torque to move the components is increased, the jams are more frequent and the wear of the components is premature.

The positioning devices 12C–D of the present invention use two precision screws 80A–B synchronized by a belt, a chain or another suitable mechanical device 82. The twin screw design ensures soft sliding of the supports 84 of the heads 6C–D without jams with an unequaled reproducibility. The required torque for actuating the systems is considerably reduced, as the wear of the components.

While embodiments of this invention have been illustrated in the accompanying drawings and described above, it will be evident to those skilled in the art that changes and modifications may be made therein without departing from the essence of this invention. For example, the controller 16 (shown in FIG. 15) may be arranged to control other parts of the planer machine, for additional automation if desired. All such modifications or variations are believed to be within the scope of the invention as defined by the claims appended hereto.

What is claimed is:

1. An automated planer machine for planing a piece of lumber having top, side and bottom surfaces, comprising:
    a feed table adapted to slidably receive the bottom surface of the piece of lumber along a traveling course;
    at least one planing head extending on a side of the traveling course and adapted to plane one of the surfaces of the piece of lumber;
    a linebar projecting on a side of the feed table and adapted to slidably receive one of the side surfaces of the piece of lumber;
    feed rolls extending along the traveling course and adapted to move the piece of lumber along the traveling course;
    a main frame wherein the feed rolls, the planing heads and the feed table are mounted on the main frame in a cantilever arrangement;
    positioning means responsive to respective control signals for adjusting a height of the feed table and a planing level of said at least one planing head with respect to said one of the surfaces of the piece of lumber according to the control signals; and
    position encoders respectively coupled to the feed table and said at least one planing head, for producing positional signals indicative of the height of the feed table and the planing level of said at least one planing head.

2. The automated planer machine according to claim 1, wherein said at least one planing head comprises upper, lower and side planing heads adapted to plane respectively the top, bottom and side surfaces of the piece of lumber along the traveling course.

3. The automated planer machine according to claim 2, further comprising a controller having inputs connected to the position encoders, a user control input, and outputs connected to the positioning means, the output producing the control signals as a function of the positional signals and user settings received by the inputs.

4. The automated planer machine according to claim 1, further comprising a presser foot extending over the feed table and adapted to press against the top surface of the piece of lumber when the piece of lumber slides on the feed table.

5. The automated planer machine according to claim 4, wherein the presser foot is provided with an adjustable sliding arrangement for adjusting a height of the presser foot over the feed table.

6. The automated planer machine according to claim 5, wherein the adjustable sliding arrangement comprises a mounting bracket to which the presser foot is secured and having an upwardly projecting male dovetail member, a main body having a female dovetail member into which the male dovetail member slides, a means for adjustably moving the mounting bracket with respect to the main body, and a locking means operating between the dovetail members for locking the mounting bracket with respect to the main body.

7. The automated planer machine according to claim 6, wherein the locking means comprises hydraulic pressure operated pistons extending across the female dovetail member and arranged to controllably press against the male dovetail member.

8. The automated planer machine according to claim 7, wherein the means for adjustably moving comprises a pneumatic jack having a cylinder secured to the main body and a movable piston having an end connected to the mounting bracket.

9. The automated planer machine according to claim 1, further comprising roll positioning means responsive to control signals for adjusting heights of at least some of the feed rolls.

10. The automated planer machine according to claim 9, wherein:
    said at least some of the feed rolls comprise the feed rolls which engage with the bottom surface of the piece of lumber; and
    the roll positioning means of each one of the feed rolls which engage with the bottom surface of the piece of lumber comprises an eccentric rolling bearing cage having an axle to which a corresponding one of the feed rolls is mounted, a jack, and an articulated lever arrangement extending between the jack and the eccentric rolling bearing cage and arranged so that operation of the jack moves the lever arrangement which rotates the eccentric rolling bearing cage, thereby vertically moving the axle.

11. The automated planer machine according to claim 9, wherein:
    said at least some of the feed rolls comprise the feed rolls which engage with the top surface of the piece of lumber; and
    the roll positioning means of each one of the feed rolls which engage with the top surface of the piece of lumber comprises a bearing member onto which a corresponding one of the feed rolls is rotatably mounted, a support pivotally holding the bearing member, and a jack mounted on the support and having a movable arm pivotally connected to the bearing member and a pressure cushion chamber for absorbing hits transmitted to the movable arm by the bearing member.

12. The automated planer machine according to claim 1, further comprising a cooling system in contact with the feed table, the cooling system having inlet and outlet ports for coolant circulation.

13. The automated planer machine according to claim 12, further comprising a presser foot extending over the feed table and adapted to press against the top surface of the piece of lumber when the piece of lumber slides on the feed table, and wherein the cooling system comprises coolant lines passing through the linebar and the presser foot.

14. The automated planer machine according to claim 2, further comprising driving shafts respectively coupled to the planing heads through coupling arrangements comprising gear teeth outwardly projecting around the shafts in engagement with gear teeth inwardly projecting from removable hydraulic sleeve bushings extending at centers of the planing heads.

15. The automated planer machine according to claim 2, wherein the positioning means of at least some of the planing heads comprise sliding supports onto which said at least some of the planing heads are mounted, pairs of transmission members respectively coupled to the sliding supports on opposite sides of the planing heads and arranged to slide the sliding supports, and drive means for respectively driving tile pairs of transmission members.

16. The automated planer machine according to claim 15, wherein the transmission members comprise twill worm screws engaging with the sliding supports, and the drive means comprise pairs of interconnected drive wheels.

17. The automated planer machine according to claim 16, wherein said at least some of the planing heads comprise the side planing heads.

18. The automated planer machine according to claim 2, further comprising:
 a mobile frame module mounted onto the rear section and sliding thereupon transversely with respect to the traveling course, the side planing heads and the positioning means of the side planing heads being mounted onto the frame module on opposite sides of the traveling course; and
 a positioning means for adjusting a lateral position of the frame module with respect to the traveling course.

19. The automated planer machine according to claim 18, further comprising a position encoder coupled to the transverse sliding frame module for producing a positional signal indicative of the lateral position of the frame module, the positioning means being responsive to a control signal.

20. The automated planer machine according to claim 19, further comprising a controller having inputs connected to the position encoders, a user control input, and outputs connected to the positioning means, the output producing the control signals as a function of the positional signals and user settings received by the inputs.

21. The automated planer machine according to claim 20, further comprising locking means responsive to lock signals, for respectively locking the positioning means, and wherein the controller has lock control outputs connected respectively to the locking means, for producing the lock signals as a function of locking conditions determined by the controller.

22. The automated planer machine according to claim 21, wherein the position encoders comprise linear encoders and the positional signals comprise direct readings provided by the linear encoders.

23. The automated planer machine according to claim 20, wherein the positioning means comprise:
 servo-motors having motors coupled to encoders and transmissions respectively coupled to the planing heads, the feed table and the frame module; and
 servo-amplifiers connected to the outputs of the controller and controlling the servo-motors as a function of the control signals.

24. An automated planer machine for planing a piece of lumber having top, side and bottom surfaces, comprising:
 a feed table adapted to slidably receive the bottom surface of the piece of lumber along a traveling course;
 at least one planing head extending on a side of the traveling course and adapted to plane one of the surfaces of the piece of lumber;
 a linebar projecting on a side of the feed table and adapted to slidably receive one of the side surfaces of the piece of lumber;
 feed rolls extending along the traveling course and adapted to move the piece of lumber along the traveling course;
 positioning means responsive to respective control signals for adjusting a height of the feed table and a planing level of said at least one planing head with respect to said one of the surfaces of the piece of lumber according to the control signals; and
 position encoders respectively coupled to the feed table and said at least one planing head, for producing positional signals indicative of the height of the feed table and the planing level of said at least one planing head
 further comprising roll positioning means responsive to control signals for adjusting heights of at least some of the feed rolls;
 wherein:
  said at least some of the feed rolls comprise the feed rolls which engage with the bottom surface of the piece of lumber; and
  the roll positioning means of each one of the feed rolls which engage with the bottom surface of the piece of lumber comprises an eccentric rolling bearing cage having an axle to which a corresponding one of the feed rolls is mounted, a jack, and an articulated lever arrangement extending between the jack and the eccentric rolling bearing cage and arranged so that operation of the jack moves the lever arrangement which rotates the eccentric rolling bearing cage, thereby vertically moving the axle.

25. The automated planer machine according to claim 24, further comprising a main frame and wherein the feed rolls, the planing heads and the feed table are mounted on the main frame in a cantilever arrangement.

26. The automated planer machine according to claim 24, further comprising a presser foot extending over the feed table and adapted to press against the top surface of the piece of lumber when the piece of lumber slides on the feed table.

27. The automated planer machine according to claim 24, further comprising roll positioning means responsive to control signals for adjusting heights of at least some of the feed rolls.

28. The automated planer machine according to claim 24, further comprising a cooling system in contact with the feed table, the cooling system having inlet and outlet ports for coolant circulation.

29. The automated planer machine according to claim 24, further comprising driving shafts respectively coupled to the planing heads through coupling arrangements comprising gear teeth outwardly projecting around the shafts in engagement with gear teeth inwardly projecting from removable hydraulic sleeve bushings extending at centers of the planing heads.

30. The automated planer machine according to claim 24, wherein the positioning means of at least some of the planing heads comprise sliding supports onto which said at least some of the planing heads are mounted, pairs of transmission members respectively coupled to the sliding supports on opposite sides of the planing heads and arranged to slide the sliding supports, and drive means for respectively driving the pairs of transmission members.

31. The automated planer machine according to claim 24, further comprising:

a mobile frame module mounted onto the rear section and sliding thereupon transversely with respect to the traveling course, the side planing heads and the positioning means of the side planing heads being mounted onto the frame module on opposite sides of the traveling course; and a positioning means for adjusting a lateral position of the frame module with respect to the traveling course.

32. An automated planer machine for planing a piece of lumber having top, side and bottom surfaces, comprising:

a feed table adapted to slidably receive the bottom surface of the piece of lumber along a traveling course;

at least one planing head extending on a side of the traveling course and adapted to plane one of the surfaces of the piece of lumber;

a linebar projecting on a side of the feed table and adapted to slidably receive one of the side surfaces of the piece of lumber;

feed rolls extending along the traveling course and adapted to move the piece of lumber along the traveling course;

a main frame wherein the feed rolls, the planing heads and the feed table are mounted on the main frame in a cantilever arrangement;

positioning means responsive to respective control signals for adjusting a height of the feed table and a planing level of said at least one planing head with respect to said one of the surfaces of the piece of lumber according to the control signals; and position encoders respectively coupled to the feed table and said at least one planing head, for producing positional signals indicative of the height of the feed table and the planing level of said at least one planing head;

wherein said at least one planing head comprises upper, lower and side planing heads adapted to plane respectively the top, bottom and side surfaces of the piece of lumber along the traveling course;

further comprising a controller having inputs connected to the position encoders, a user control input, and outputs connected to the positioning means, the output producing the control signals as a function of the positional signals and user settings received by the inputs.

33. The automated planer machine according to claim 32, further comprising a main frame and wherein the feed rolls, the planing heads and the feed table are mounted on the main frame in a cantilever arrangement.

34. The automated planer machine according to claim 32, further comprising a presser foot extending over the feed table and adapted to press against the top surface of the piece of lumber when the piece of lumber slides on the feed table.

35. The automated planer machine according to claim 32, further comprising roll positioning means responsive to control signals for adjusting heights of at least some of the feed rolls.

36. The automated planer machine according to claim 32, further comprising a cooling system in contact with the feed table, the cooling system having inlet and outlet ports for coolant circulation.

37. The automated planer machine according to claim 32, further comprising driving shafts respectively coupled to the planing heads through coupling arrangements comprising gear teeth outwardly projecting around the shafts in engagement with gear teeth inwardly projecting from removable hydraulic sleeve bushings extending at centers of the planing heads.

38. The automated planer machine according to claim 32, wherein the positioning means of at least some of the planing heads comprise sliding supports onto which said at least some of the planing heads are mounted, pairs of transmission members respectively coupled to the sliding supports on opposite sides of the planing heads and arranged to slide the sliding supports, and drive means for respectively driving the pairs of transmission members.

39. The automated planer machine according to claim 32, further comprising:

a mobile frame module mounted onto the rear section and sliding, thereupon transversely with respect to the traveling course, the side planing heads and the positioning means of the side planing heads being mounted onto the frame module on opposite sides of the traveling course; and a positioning means for adjusting a lateral position of the frame nodule with respect to the traveling course.

* * * * *